Figure 1:
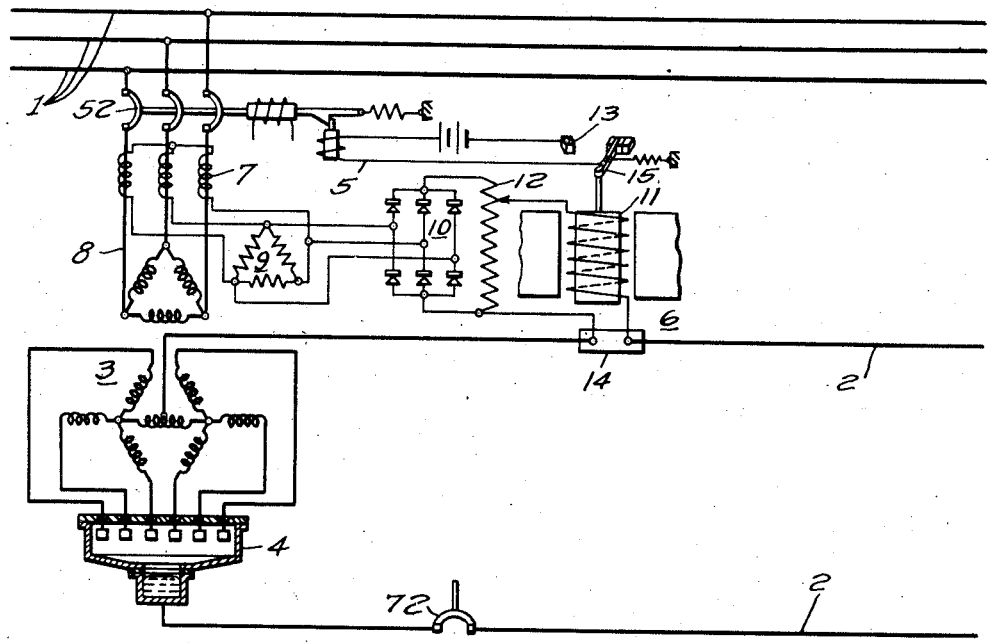

July 18, 1944.   W. R. TALIAFERRO   2,354,158
VAPOR ELECTRIC DEVICE
Filed July 31, 1940

WITNESSES:
E. A. McCloskey
Q. J. Fitzgerald

INVENTOR
William R. Taliaferro.
BY S. A. Strickler
ATTORNEY

Patented July 18, 1944

2,354,158

UNITED STATES PATENT OFFICE 2,354,158

VAPOR-ELECTRIC DEVICE

William R. Taliaferro, Pittsburgh, Pa., assignor to Westinghouse Electric & Manufacturing Company, East Pittsburgh, Pa., a corporation of Pennsylvania Application July 31, 1940, Serial No. 348,751

7 Claims. (Cl. 175—363)

My invention relates to a vapor-electric device, and particularly, control means for disconnecting a vapor-electric device in the event of arc back or internal short circuits.

In the operation of vapor-electric devices, it has heretofore been customary to provide a high speed reverse-current breaker on the direct-current side and a relatively slow-speed over-current relay to trip the breaker on the alternating-current side. Because of the use of the relatively slow-speed relay used to trip the alternating-current breaker, it has heretofore been customary to interlock the alternating-current breaker with the reverse-current breaker in order to secure quick disconnection of the rectifier in the event of arc back or internal short circuit in the rectifier.

When a rectifier is used to feed a stub end load or other load in which there would be no feed back from the load system, there is a material interval between the beginning of the arc back and the time when the slow-speed alternating-current breaker disconnects the rectifier from the alternating-current circuit.

There are several further objections to the above sequence of operation in that the induction type or overload type relay is not able to distinguish between an arc back and a short circuit on the direct-current load system. This latter is important because reclosure is permitted after an arc back has occurred, but is not desirable in the event of a short circuit.

In order to eliminate the above-noted difficulties, I have arranged a relay system which will operate either on multiple feed or on stub end feed to rapidly disconnect the rectifier in the event of arc back. In the system according to my invention, I have provided a shunt in the direct-current circuit, the polarity of which is dependent on the direction of current flow in the shunt and the potential of which is dependent on the amount of current flow in the shunt. Also, I have provided a current transformer system for producing a potential proportional to the current flowing between the alternating-current circuit and the transformer.

In order to secure rapid disconnection of the converter in the event of an arc back, I have provided a relay device which is triggered by unbalance between the potential secured from the shunt and the potential secured from the current transforming device. This relay may be either of a galvanometer type or of the tube type. In either event, the relay is utilized to supply operating current to a tripping circuit for either one or both of the breakers in series with the rectifier.

It is accordingly an object of my invention to provide a relay system for rapidly disconnecting a rectifier in the event of arc back.

It is a further object of my invention to provide a relay system which is sensitive to unbalance between the currents flowing in an alternating-current circuit and a connected direct-current circuit.

Figure 2:
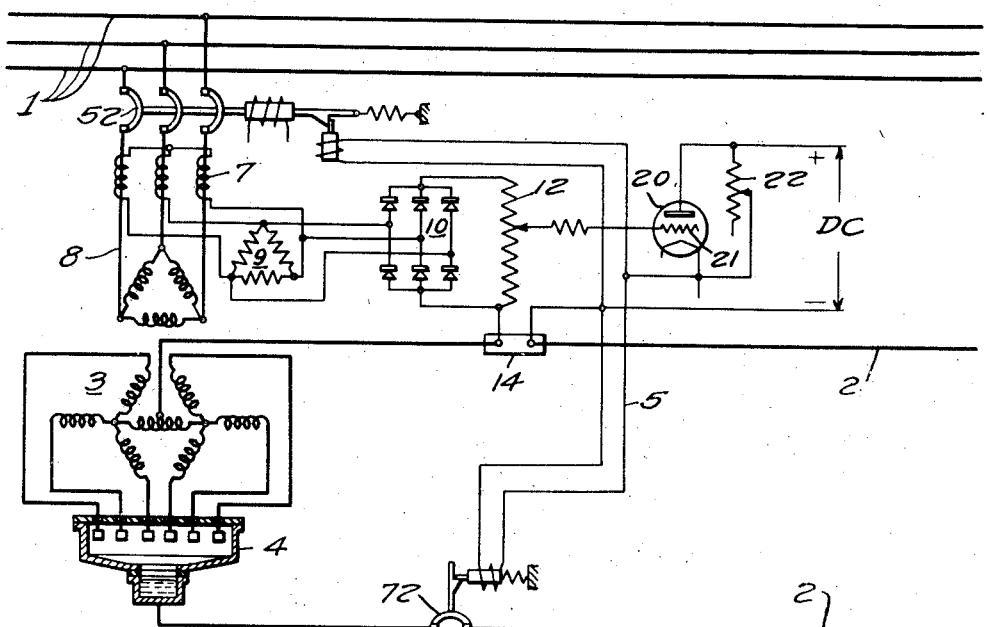

Other objects and advantages of my invention will be apparent from the following detailed description taken in conjunction with the accompanying drawing, in which:

Figure 1 is a schematic illustration of a vapor-electric converter embodying my invention; and Fig. 2 is a similar illustration showing a tube type relay.

In the exemplary embodiment of my invention according to Fig. 1, an alternating-current circuit 1 is connected to a direct-current circuit 2 by means of a suitable transformer 3 and the flow of current through the transformer 3 is controlled by a suitable vapor-electric device 4 herein illustrated as of the multiple-anode single-tank type, but which may be any valve type converter in which the valves may be either in a single container or in a plurality of separate containers. The alternating-current circuit 1 is connected to the rectifier transformer 3 by means of a suitable circuit breaker 52. Also the direct-current circuit 2 is provided with a suitable reverse-current breaker 72. Either one or both of these breakers 52 or 72 may be provided with a suitable tripping circuit 5 controlled by a relay 6.

In order to secure operating current for the relay 6, I have provided a current transformer 7 associated with the connections 8 from the alternating-current circuit 1 to the rectifying device 4. A suitable loading device, such as resistors 9, are connected across the terminals of the current transformer 7 and so proportioned that the output potential on the current transformer 7 is proportional to the alternating-current passing to the transformer 3. The output potential of transformer 7 is rectified preferably by a suitable full-wave device 10 and connected to an operating coil 11 of the relay 6, preferably through the intervention of a suitable potentiometer 12 which permits adjustment of the potential applied to the operating coil 11 of the relay 6. Balanced against this first-mentioned potential in the coil 11 is a second potential secured by connecting across the terminals of a shunt 14 in the direct-current circuit 2. By properly adjusting the potentiometer 12, the two potentials will counteract each other and the contact arm 15, which is spring biased, will be held in an inoperative position. However, if for any reason, the potential secured from the alternating current should be greater than the potential secured from the direct-current, the relay 6 would be operated to close its contacts 13 and trip the alternating-current breaker 52, and if desired, also the direct-current breaker 72. Also in the event of arc back producing reverse current through the shunt 14, the polarity of the potential applied to the associated coil 11 would be reversed, likewise producing operation of the relay device 6.

In the modification of my invention according to Fig. 2, the moving armature relay 6 has been replaced by an electronic device in the form of a grid-controlled relay tube 20. The potentials derived from the current transformer 7 and the potential derived from the direct-current shunt 14 are connected to produce a suitable bias on a grid 21 of the relay tube 20. I prefer to accomplish this negative bias by utilizing a portion of the operating potential for the tripping circuit 5. For accomplishing this, I have connected the positive terminal of the shunt 14 to the negative side of the tripping circuit 5, while the negative side of the shunt 14 is connected to the potentiometer 12 which is, in turn, connected to the control grid 21. By properly adjusting the potentiometer connection, the grid 21 will be maintained negative for a normal current operation but in the event of reverse current through the shunt 14, or the failure or non-proportional reduction of current through the shunt 14, the grid 21 will be positive, permitting the current to flow through the relay tube 20 through the tripping circuits 5 of one or both of the series circuit breakers 52 or 72.

In order to stabilize the operation of the tube 20, I prefer to provide a trickle circuit in the form of a resistor 22 connected in parallel with the relay tube 20. This resistor 22 is of such value that insufficient current will flow therethrough to operate the tripping circuits 5 of either the 52 or the 72 breakers.

While for purposes of illustration, I have shown and described specific embodiments of my invention, it will be apparent that changes and modifications can be made therein without departing from the true spirit of my invention or the scope of the appended claims.

I claim as my invention:

1. A conversion system comprising an alternating-current circuit, a direct-current circuit, a multi-valve vapor-electric converter for transferring energy between said circuits, current transformer means for providing a potential proportional to the current flowing between said alternating-current circuit and said converter, means for rectifying the output potential of said current transformer means, a shunt for providing a potential proportional to the current in the direct-current circuit, the polarity of said potential being dependent on the direction of current flow in said direct-current circuit, means for balancing said potentials for normal operation of said converter, a relay including a single winding connected to be energized by unbalance of said potentials, a circuit breaker connected between said alternating-current circuit and said converter, tripping means for said circuit breaker, said tripping means being energized by operation of said relay means.

2. A conversion system comprising an alternating-current circuit, a direct-current circuit, a transformer interconnecting said circuit, a multi-valve vapor-electric converter for controlling the flow of current between said circuits, a circuit breaker connected between said alternating-current circuit and said transformer, a current transformer energized by current flow between said alternating-current circuit and said transformer, a load connected to the current transformer, a full-wave rectifier device connected to said current transformer, a voltage divider connected across the terminals of the rectifing device, a shunt in the direct-current circuit, a single relay winding, circuit means for impressing the potential of the shunt and the potential of the voltage divider in opposition through said winding, a trip circuit for said circuit breaker, a source of operating potential for said trip circuit, and means controlled by said relay for applying said potential to said trip circuit.

3. A conversion system comprising an alternating-current circuit, a direct-current circuit, a transformer interconnecting said circuits, a multi-valve vapor-electric converter for controlling the flow of current between said circuits, a circuit breaker connected between said alternating-current circuit and said transformer, a current transformer energized by current flow between said alternating-current circuit and said transformer, a load connected to the current transformer, a full-wave rectifier device connected to said current transformer, a voltage divider connected across the terminals of the rectifying devices, a shunt in the direct-current circuit, a tripping circuit for said circuit-breaker, a source of operating potential for said tripping circuit, a valve type relay for applying the operating potential to said tripping circuit, a control electrode in said valve type relay and circuit means for impressing the potential of said shunt and the potential of said voltage divider on said control electrode for determining the operation of said valve type relay.

4. A conversion system comprising an alternating-current circuit, a direct-current circuit, a transformer interconnecting said circuits, a multi-valve vapor-electric converter for controlling the flow of current between said circuits, a circuit breaker connected between said alternating-current circuit and said transformer, a current transformer energized by current flow between said alternating-current circuit and said transformer, a load connected to the current transformer, a full-wave rectifier device connected to said current transformer, a voltage divider connected across the terminals of the rectifying devices, a shunt in the direct-current circuit, a tripping circuit for said circuit breaker, a source of operating potential for said tripping circuit, a valve type relay for applying the operating potential to said tripping circuit, a control electrode in said valve type relay and circuit means for impressing the potential of said shunt and the potential of said voltage divider on said control electrode for determining the operation of said valve type relay, and a trickle circuit in parallel with said valve type relay for stabilizing the operating characteristics thereof.

5. A conversion system comprising an alternating current circuit, a direct-current circuit, a multi-valve vapor-electric converter for transferring energy between said circuits, transformer means interposed between said alternating-current circuit and said converter, connections between said transformer means and said alternating current circuit, current transformers associated with said connections for providing a potential proportional to the alternating current flowing between said alternating-current circuit and said transformer means, a stabilizing load connected to said current transformers, a full wave rectifier connected to said current transformers, a shunt in said direct-current circuit, a single coil relay, connections for impressing the potential of said shunt and said rectifier in opposition through said relay and means to balance said potentials for normal operation of the converter.

6. Current-balancing relaying-equipment for a polyphase conversion-apparatus, said conversion-apparatus effecting a power-interchange between a direct-current circuit on the one hand, and a polyphase circuit on the other hand, said relaying-equipment comprising means including a plurality of full-wave rectifiers for obtaining an alternating-current-responsive, unidirectional relaying-voltage proportionate to the amount of current-flow in each phase of the polyphase side of the conversion-apparatus, means for obtaining a direct-current-responsive, unidirectional relaying-voltage proportionate to the amount of current-flow in the direct-current side of the conversion-apparatus, means for combining the several alternating-current-responsive relaying voltages to obtain a resultant unidirectional relaying-voltage, relaying-means for obtaining a differential response to said resultant relaying-voltage and to said direct-current-responsive relaying-voltage, and means energized by said relaying-means for determining operation of said conversion apparatus.

7. Current-balancing relaying system for a polyphase valve-type converter interconnecting a polyphase alternating-current circuit and a direct-current circuit comprising means for obtaining a potential proportional to the current in each phase of said converter, means for rectifying said potentials, a voltage divider connected to the direct-current terminals of all of said rectifier means, means for obtaining a unidirectional potential proportional to the direct-current output of said converter, relay means responsive to the difference in two potential connections for impressing the potential of said voltage divider and the potential proportional to the output direct current on said relay means, and means energized by operation of said relay means for controlling operation of said converter.

WILLIAM R. TALIAFERRO.